United States Patent
Song et al.

(10) Patent No.: US 9,565,002 B2
(45) Date of Patent: Feb. 7, 2017

(54) CRS INTERFERENCE MITIGATION FOR EPDCCH/PDSCH DEMODULATION UNDER COMP

(71) Applicant: TELEFONAKTIEBOLAGET L M ERICSSON (PUBL), Stockholm (SE)

(72) Inventors: Xinghua Song, Beijing (CN); Shaohua Li, Beijing (CN)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 0 days.

(21) Appl. No.: 14/432,637

(22) PCT Filed: Oct. 6, 2012

(86) PCT No.: PCT/CN2012/082529
§ 371 (c)(1),
(2) Date: Mar. 31, 2015

(87) PCT Pub. No.: WO2014/053076
PCT Pub. Date: Apr. 10, 2014

(65) Prior Publication Data
US 2015/0256302 A1    Sep. 10, 2015

(51) Int. Cl.
*H04L 5/00* (2006.01)
*H04J 11/00* (2006.01)
*H04W 72/04* (2009.01)

(52) U.S. Cl.
CPC .............. *H04L 5/005* (2013.01); *H04J 11/005* (2013.01); *H04J 11/0036* (2013.01);
(Continued)

(58) Field of Classification Search
CPC ... H04J 11/005; H04J 11/0036; H04J 11/0053; H04W 72/042; H04L 5/005; H04L 5/0053; H04L 5/0035
See application file for complete search history.

(56) References Cited

U.S. PATENT DOCUMENTS

2011/0243009 A1* 10/2011 Chandrasekhar ..... H04W 24/10
370/252
2012/0082022 A1* 4/2012 Damnjanovic ........ H04J 11/005
370/201
(Continued)

FOREIGN PATENT DOCUMENTS

CN          102300244       12/2011
WO     WO 2011/130451      10/2011
WO     WO 2011137314       11/2011

OTHER PUBLICATIONS

PCT Notification of Transmittal of the International Search Report and the Written Opinion of the International Searching Authority, or the Declaration for International application No. PCT/CN2012/082529, Jun. 27, 2013.
(Continued)

*Primary Examiner* — Ajay Cattungal
(74) *Attorney, Agent, or Firm* — Patents on Demand P.A.; Brian K. Buchheit; Scott M. Garrett

(57) ABSTRACT

A method for a User Equipment (UE) to mitigate Cell-specific Reference Signal (CRS) interference (not only the other interference cells' CRS interference but also the serving cell's CRS interference) during ePDCCH/PDSCH demodulation is described. The method includes determining that the CRS having been configured is not serving cell's CRS. Further, interference originating from the serving cell's CRS is mitigated by referring to serving cell's CRS configuration.

12 Claims, 7 Drawing Sheets

(52) U.S. Cl.
CPC ........ *H04J 11/0053* (2013.01); *H04L 5/0035* (2013.01); *H04L 5/0053* (2013.01); *H04W 72/042* (2013.01)

(56) References Cited

U.S. PATENT DOCUMENTS

| | | | |
|---|---|---|---|
| 2012/0329400 A1* | 12/2012 | Seo .................. | H04J 11/005 455/63.1 |
| 2013/0044664 A1* | 2/2013 | Nory ................ | H04L 1/0045 370/311 |
| 2013/0250874 A1* | 9/2013 | Luo .................. | H04W 72/04 370/329 |
| 2014/0003324 A1* | 1/2014 | Davydov ........... | H04W 4/06 370/312 |
| 2014/0086166 A1* | 3/2014 | Lindbom ........... | H04W 52/16 370/329 |
| 2014/0269246 A1* | 9/2014 | Yoo .................. | H04J 3/10 370/201 |
| 2014/0357255 A1* | 12/2014 | Jonsson ............ | H04W 52/16 455/422.1 |
| 2015/0016376 A1* | 1/2015 | Seo .................. | H04W 72/0406 370/329 |

OTHER PUBLICATIONS

3GPP TSG-RAN WG1 #70bis; San Diego, USA; Title: On resolving ePDCCH aggregation level ambiguity (R1-124159), Oct. 8-12, 2012.
3GPP TSG-RAN WG1 #70bis; San Diego, USA; Title: Mapping of ePDCCH to RE (R1-124149), Oct. 8-12, 2012.

* cited by examiner

| 11 | 7 | 3 | 15 | 11 | | | 3 | 15 | 11 | 7 | 3 | |
|---|---|---|---|---|---|---|---|---|---|---|---|---|
| R1 | 6 | 2 | 14 | R0 | | | R1 | 14 | 10 | 6 | R0 | |
| 9 | 5 | 1 | 13 | 9 | 1 | 7 | 1 | 13 | 9 | 5 | 1 | 9 | 15 |
| 8 | 4 | 0 | 12 | 8 | 0 | 6 | 0 | 12 | 8 | 4 | 0 | 8 | 14 |
| R0 | 3 | 15 | 11 | R1 | 15 | 5 | R0 | 11 | 7 | 3 | R1 | 7 | 13 |
| 6 | 2 | 14 | 10 | 6 | | | 14 | 10 | 6 | 2 | 14 | |
| 5 | 1 | 13 | 9 | 5 | | | 13 | 9 | 5 | 1 | 13 | |
| R1 | 0 | 12 | 8 | R0 | 14 | 4 | R1 | 8 | 4 | 0 | R0 | 6 | 12 |
| 3 | 15 | 11 | 7 | 3 | 13 | 3 | 11 | 7 | 3 | 15 | 11 | 5 | 11 |
| 2 | 14 | 10 | 6 | 2 | 12 | 2 | 10 | 6 | 2 | 14 | 10 | 4 | 10 |
| R0 | 13 | 9 | 5 | R1 | | | R0 | 5 | 1 | 13 | R1 | |
| 0 | 12 | 8 | 4 | 0 | | | 8 | 4 | 0 | 12 | 8 | |

R0 CRS   R1 CRS   DMRS

CRS     CRS

| 11 | 7 | 3 | 15 | 11 | | | 3 | 15 | 11 | 7 | 3 | |
|---|---|---|---|---|---|---|---|---|---|---|---|---|
| R1 | 6 | 2 | 14 | R0 | | | R1 | 14 | 10 | 6 | R0 | |
| 9 | 5 | 1 | 13 | 9 | 1 | 7 | 1 | 13 | 9 | 5 | 1 | 9 | 15 |
| 8 | 4 | 0 | 12 | 8 | 0 | 6 | 0 | 12 | 8 | 4 | 0 | 8 | 14 |
| R0 | 3 | 15 | 11 | R1 | 15 | 5 | R0 | 11 | 7 | 3 | R1 | 7 | 13 |
| 6 | 2 | 14 | 10 | 6 | | | 14 | 10 | 6 | 2 | 14 | |
| 5 | 1 | 13 | 9 | 5 | | | 13 | 9 | 5 | 1 | 13 | |
| R1 | 0 | 12 | 8 | R0 | 14 | 4 | R1 | 8 | 4 | 0 | R0 | 6 | 12 |
| 3 | 15 | 11 | 7 | 3 | 13 | 3 | 11 | 7 | 3 | 15 | 11 | 5 | 11 |
| 2 | 14 | 10 | 6 | 2 | 12 | 2 | 10 | 6 | 2 | 14 | 10 | 4 | 10 |
| R0 | 13 | 9 | 5 | R1 | | | R0 | 5 | 1 | 13 | R1 | |
| 0 | 12 | 8 | 4 | 0 | | | 8 | 4 | 0 | 12 | 8 | |

R0 CRS   R1 CRS   DMRS

CRS Polluted REs

CRS INTERFERENCE MITIGATION FOR EPDCCH/PDSCH DEMODULATION UNDER COMP

PRIORITY

This nonprovisional application is a U.S. National Stage Filing under 35 U.S.C. §371 of International Patent Application Serial No. PCT/CN2012/082529 filed Oct. 6, 2012, and entitled "CRS INTERFERENCE MITIGATION FOR EPDCCH/PDSCH DEMODULATION UNDER COMP".

TECHNICAL FIELD

The disclosure relates to the field of wireless communications, and more particularly, to a scheme for CRS interference mitigation for ePDCCH/PDSCH demodulation under CoMP.

BACKGROUND

3GPP has been continuously working on the further evolutions of Long Term Evolution (LTE) to meet the demands for even higher data rates and network capacity. A lot of advanced features have been introduced to enhance the peak data rate, such as Multi-Input Multi-Output (MIMO), Coordinated MultiPoint transmission/reception (COMP), Carrier Aggregation (CA). However, these techniques mainly target to boost the data channel. With the exploding growth in the number of connections per cell, the control channel capacity becomes the bottleneck of the system performance. The design principles of control channel in early releases are not appropriate any more. Currently 3GPP is working on designing a new control channel, termed as "enhanced PDCCH (ePDCCH)" hereunder.

The discussions in RAN1 for ePDCCH is ongoing and a lot of details have not yet been decided, e.g. eREG/eCCE to RE mapping, DM-RS antenna port association and scrambling sequence initialization, search space design, PUCCH HARQ-ACK resource allocation for ePDCCH, etc.

In the ePDCCH discussion, whether to signal the CRS configuration for each ePDCCH set has not been decided in 3GPP. In each ePDCCH set, if the CRS configuration is different from serving cell CRS configuration, how to handle the serving cell CRS and ePDCCH RE mapping is still to be discussed.

SUMMARY

According to a first aspect of the present disclosure, there is provided a CRS interference mitigation method, including steps of: determining CRS having been configured (excluded in mapping) is not serving cell's CRS; and mitigating interference originating from the serving cell's CRS by referring to serving cell's CRS configuration.

In one embodiment, the CRS interference mitigation method may further include a step of detecting a current ePDCCH set configuration to determine a CRS configuration (e.g., including cell ID (may be used to determine a scrambling sequence and a CRS shift) and the number of antenna ports) included in the current ePDCCH set configuration.

In another embodiment, the CRS interference mitigation method may further include a step of acquiring DCI to determine a CRS configuration signaled in the DCI.

If the determined CRS configuration is not identical to the serving cell's CRS configuration, it is determined that the CRS having been configured is not the serving cell's CRS. Otherwise, if the determined CRS configuration is identical to the serving cell's CRS configuration, it is determined that the CRS having been configured is the serving cell's CRS.

In still another embodiment, the CRS interference mitigation method may further include a step of mitigating other interference cell's CRS by referring to other CRS assistant information.

According to a second aspect of the present disclosure, there is provided a User Equipment (UE) including: a CRS mitigation determination unit configured to determine CRS having been configured (excluded in mapping) is not serving cell's CRS; and a CRS mitigation unit configured to mitigate interference originating from the serving cell's CRS by referring to serving cell's CRS configuration.

In one embodiment, the UE may further include an ePDCCH set detection unit configured to detect a current ePDCCH set configuration to determine a CRS configuration included in the current ePDCCH set configuration.

In another embodiment, the UE may further include a DCI acquisition unit configured to acquire DCI to determine a CRS configuration signaled in the DCI.

When the determined CRS configuration is not identical to the serving cell's CRS configuration, the CRS mitigation determination unit determines the CRS having been configured is not the serving cell's CRS. Otherwise, when the determined CRS configuration is identical to the serving cell's CRS configuration, the CRS mitigation determination unit determines the CRS having been configured is the serving cell's CRS.

In still another embodiment, the CRS mitigation unit is further configured to mitigate other interference cell's CRS by referring to other CRS assistant information.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

Hereunder, the embodiments of the present disclosure will be described in accordance with the drawings. In the following description, some particular embodiments are used for the purpose of description only, which shall not be understood as any limitation to the present disclosure but the examples thereof. While it may blur the understanding of the present disclosure, the conventional structure or construction will be omitted.

Different from PDCCH processing, ePDCCH processing needs to handle each ePDCCH set and their corresponding eCCEs individually. In PDCCH processing, the CCEs from each encoded PDCCH are concatenated and cell specific scrambling is applied before modulation, interleaving and a cell specific cyclic shift. The interleaving and cell specific cyclic shift of the interleaved sequence enables exploitation of frequency diversity and inter-cell interference randomization respectively.

For ePDCCH processing on the other hand, the eCCE to RE mapping is pre-determined within the set of ePDCCH resources as soon as the eCCE index is known. Hence, there is no need for interleaving multiple ePDCCH transmissions (cf. Reference [1]). It should be noted that scrambling can be UE specific (cf. Reference [2]).

The remaining issue is how to perform the mapping of the encoded bits to REs. As already being agreed, an RE that collides with any other signal is not used for ePDCCH, and code chain rate matching is used around CRS and the region up to the PDSCH starting position. Furthermore, one of the main applicable situations of ePDCCH is operation with large Cell Range Expansion (CRE) where received CRS power from neighboring cell could be significantly larger than CRS power received from serving cell. Therefore, the possibility to map ePDCCH around the CRS from a neighboring cell instead of the serving cell would provide a significant performance benefit for the ePDCCH for UE with large CRE. This principle has already been agreed for PDSCH in the CoMP WI and it can be envisioned that the same benefit can be given to the ePDCCH. A difference is that dynamic signaling is not possible; however, for ePDCCH we have the structure of ePDCCH sets where a set can be associated with ePDCCH transmissions from a certain transmission point. Therefore, it should be possible to configure, per set, which CRS that should be excluded in the ePDCCH mapping. Hence, in configuration of an ePDCCH set, one CRS configuration is possible signaled. UE may know that, the CRS RE to which the ePDCCH is not mapped is the CRS signaled by the configuration.

In order to support dynamic point selection or dynamic point blanking, the mapping of ePDCCH is proposed to be around the CRS from a neighbor cell instead of the serving cell (cf. Reference [1]). In large cell range extension scenarios, this provides significant performance benefit for ePDCCH.

Figure 1A:
FIG. 1A is a schematic diagram showing ePDCCH mapped around neighbor cell CRS.
Figure 1A:
Figure 1A:
Figure 1B:
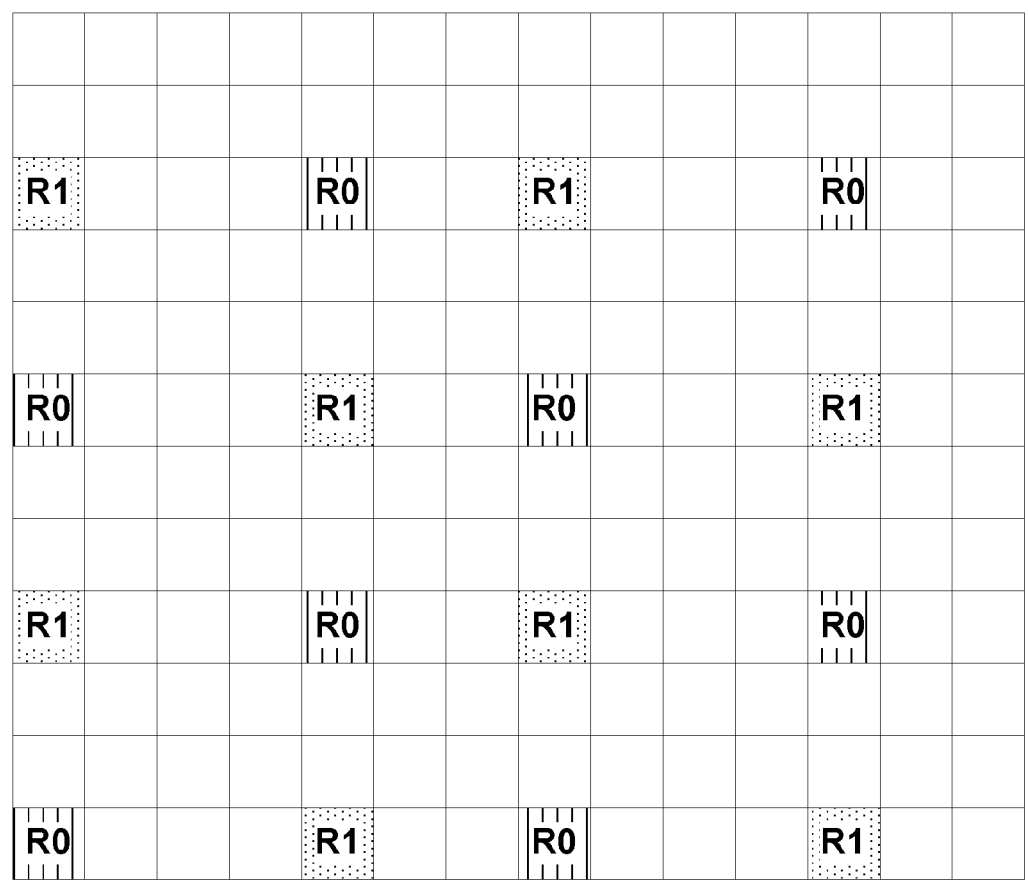
FIG. 1B is a schematic diagram showing serving cell's CRS mapping.
Figure 1B:
Figure 1B:
Figure 2:
FIG. 2 is a schematic diagram explaining the received data at the UE side with the ePDCCH shown in FIG. 1A and the serving cell's CRS shown in FIG. 1B.
Figure 2:
Figure 2:
Figure 2:

Assume the serving cell CellId=1 and the neighbor cell CellId=0. If ePDCCH is mapped around neighbor cell CRS, the mapping is shown in FIG. 1A. However, the serving cell's CRS shall be always transmitted in order to support legacy UE and other UEs using CRS, as shown in FIG. 1B. In this case, the serving cell CRS would be the interference to the ePDCCH. In FIG. 2, the received data at the UE side is shown. From FIG. 2, the REs polluted by serving cell CRS (termed as "CRS-polluted REs" hereunder) are marked with bold-edged blocks. In the CRS-polluted REs, not only ePDCCH is received, but also the serving cell CRS is received.

The CRS-polluted REs have to cope with a new interference scenario: the interference comes from its own serving cell's CRS instead of other cells' CRS. In traditional CRS interference mitigation, such as CRS mitigation in FeICIC, the mitigated CRS is always coming from neighbor cells. The configuration is semi-static. But in this case, the CRS interference comes from its own serving cell, and it is dynamically changed from subframe to subframe. For these new interference scenarios, UE need new procedure to handle this kind of interference.

This disclosure provides a method for the UE to mitigate CRS interference (not only the other interference cells' CRS interference but also the serving cell's CRS interference) during ePDCCH/PDSCH demodulation. For ePDCCH set where the associated CRS configuration is different from serving cell, ePDCCH should be mapped around signaled CRS configuration instead of the serving cell's CRS. This results in that the serving cell CRS will interfere the ePDCCH transmitted from another transmission point. This is different from traditional scenarios and thus new UE behavior should be specified to handle the interference for ePDCCH reception. We propose that the UE should mitigate the interference from its own serving cell's CRS if the configured CRS configuration in the ePDCCH configuration is not the same as the serving cell. With the introduction of this interference mitigation, the ePDCCH demodulation performance can be improved. As found and proposed by the inventors, the similar cases are also true for PDSCH.

For identifying whether the serving cell's CRS is interfering the ePDCCH or PDSCH, the parameter CRS configuration (e.g., including cell ID (may be used to determine a scrambling sequence and a CRS shift) and the number of antenna ports), denoted as "CRS_Configuration" hereunder, may be used. Each configuration of an ePDCCH set contains a CRS_Configuration to signal/identify a CRS configuration (which CRS that should be excluded in the ePDCCH mapping) as well as the number of antenna ports. Slightly different, for PDSCH, a CRS_Configuration is contained in DCI to signal/identify a CRS configuration (which CRS that should be excluded in the PDSCH mapping) as well as the number of antenna ports. Therefore, with a comparison of the CRS_Configuration of each ePDCCH set configuration (or the CRS_Configuration of DCI for each PDSCH configuration) and the CRS_Configuration of its own serving cell, a UE may identify whether the serving cell's CRS is interfering the ePDCCH or PDSCH.

In this case,

UE shall assume CRS of serving cell is interference for ePDCCH decoding when the configured CRS_Configuration in this ePDCCH set is different from serving cell's CRS_Configuration; or UE shall assume CRS of serving cell is interference for PDSCH decoding when the signaled CRS_Configuration in DCI is different from serving cell's CRS_Configuration.

CRS Mitigation for ePDCCH Under CoMP

For ePDCCH, in order to support dynamic point selection and other CoMP schemes, it should be possible to configure, per set, which CRS that should be excluded in the ePDCCH mapping. In each configuration of an ePDCCH set, one CRS configuration (i.e., which CRS that should be excluded in the PDSCH mapping) is signaled (the CRS configuration can be identified/signaled by a parameter, CRS_Configuration, of the cell transmitting the CRS to be excluded). When the CellId configured in some ePDCCH set is not the same as the serving cell's CellId, the serving cell's CRS will interfere some ePDCCH REs, as previously shown in FIG. 2. In order to improve the CRS-polluted REs detection performance, the serving cell CRS interference can be mitigated.

Figure 3:
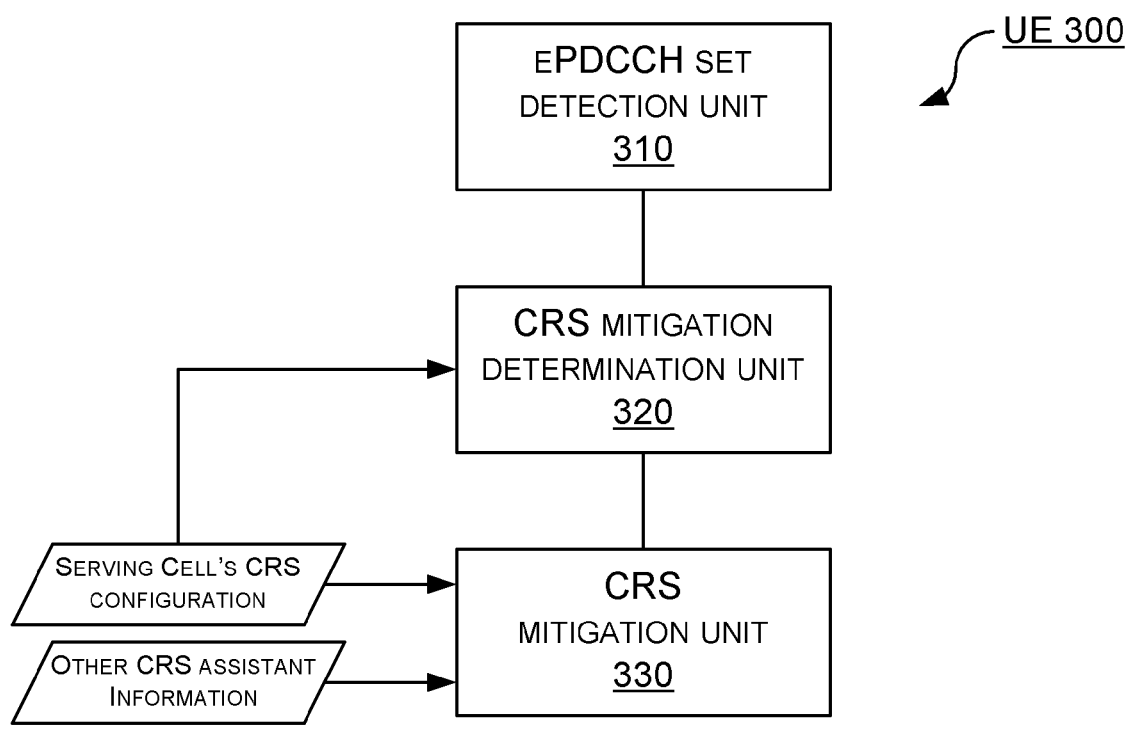
FIG. 3 shows a block diagram of UE 300 which has the capability of mitigating the serving cell CRS interference for ePDCCH demodulation.

FIG. 3 shows a block diagram of UE 300 which has the capability of mitigating the serving cell CRS interference for ePDCCH demodulation.

As shown in FIG. 3, the UE 300 may include an ePDCCH set detection unit 310, a CRS mitigation determination unit 320, and a CRS mitigation unit 330.

The ePDCCH set detection unit 310 detects a current ePDCCH set configuration, in particularly, a CRS_Configuration included in the current ePDCCH set configuration (in the corresponding CRS configuration information) can be determined.

The CRS mitigation determination unit 320 can determine whether the CRS is to be mitigated or not. For the serving cell's CRS, the CRS mitigation determination unit 320 determines whether the CRS_Configuration detected by the ePDCCH set detection unit 310 is the same as the UE's serving cell's CRS_Configuration. If the two CRS_Configurations are identical, it means that the ePDCCH is coming from the UE's serving cell and there is no need to mitigate the serving cell's CRS (because the ePDCCH is around the serving cell's CRS and the serving cell's CRS do not interfere the ePDCCH). On the other hand, if the two CRS_Configurations are not identical, it means the ePDCCH is coming from a neighbor cell but not the serving cell and there is a need to mitigate the serving cell's CRS (cf. FIG. 2). In both cases, the CRS mitigation determination unit 320 may further determine whether some other interference cell CRS need to be mitigated, for example, by referring to other CRS assistant information (which can be obtained from NeighCellsCRSInfo-r11 defined in 3GPP TS 36.331).

The CRS mitigation unit 330 is used for mitigating either or both of the serving cell's CRS and the other interference cell's CRS according to the determination results from the CRS mitigation determination unit 320. Any existing CRS interference mitigation techniques can be applicable to the serving cell's CRS and/or the other interference cell's CRS.

Thereafter, the CRS mitigation unit 330 can provide the data from which the CRS interference has been mitigated, for the subsequent ePDCCH demodulation.

Figure 4:
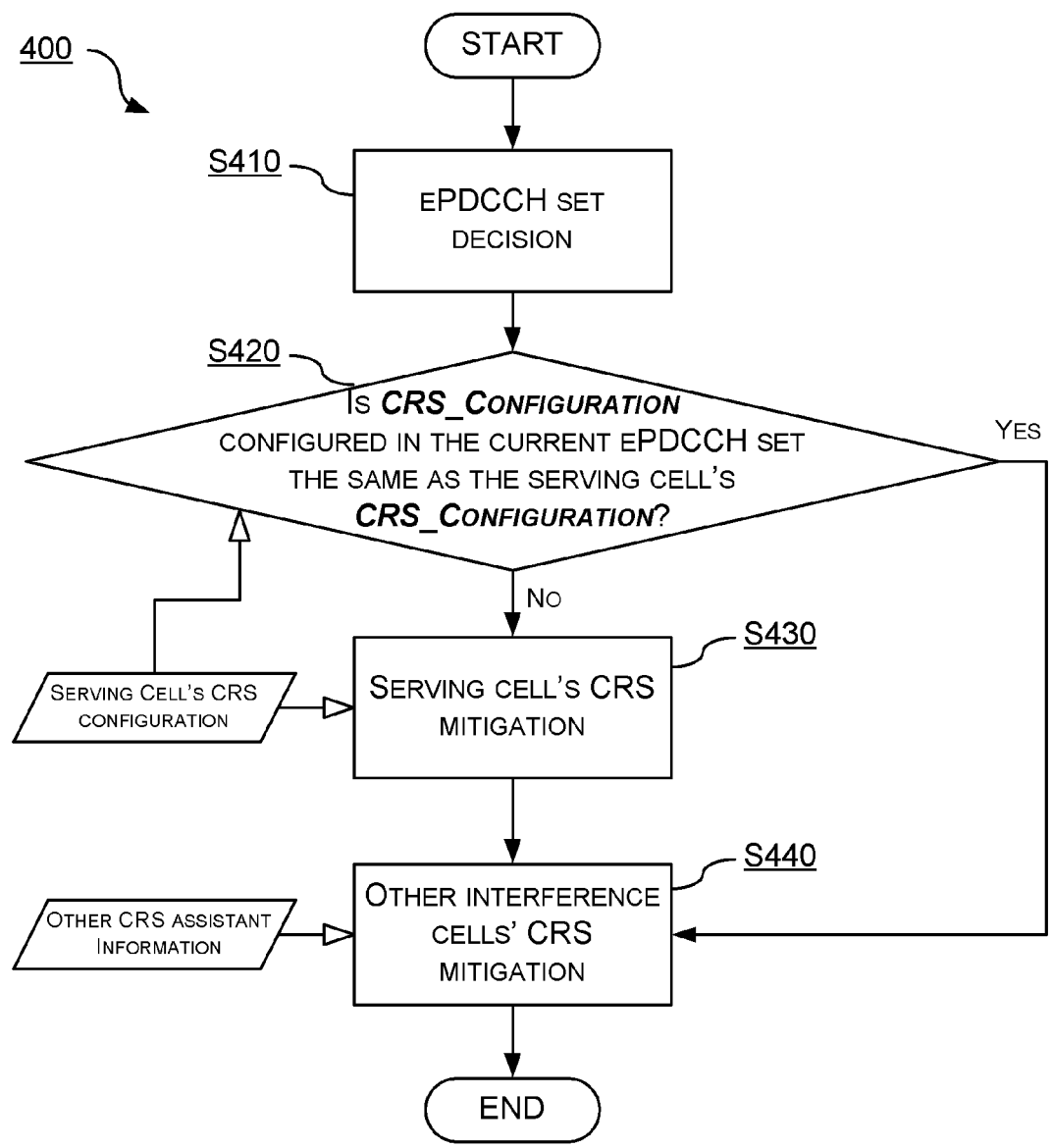
FIG. 4 shows a flowchart of the CRS interference mitigation method 400 for ePDCCH demodulation according to the present disclosure.

FIG. 4 shows a flowchart of the CRS interference mitigation method 400 for ePDCCH demodulation according to the present disclosure.

According to FIG. 4, the following steps for CRS interference mitigation may be included.

Step S410, "ePDCCH set decision", UE (e.g., UE 300 in FIG. 3) can decide which ePDCCH set will be explored for ePDCCH according to pre-defined rule (monitoring the search space), and extract the corresponding CRS configuration information (including the CRS_Configuration).

Step S420, "Is CRS_Configuration configured in the current ePDCCH set the same as the serving cell's CRS_Configuration?", UE can decide whether the serving cell's CRS is interfering the ePDCCH or not.

If the configured CRS_Configuration obtained in Step S410 is the same as the serving cell's CRS_Configuration, it can predict ePDCCH is transmitted from the serving cell. Serving cell's CRS is not interference. Then, the procedure goes to Step S440.

If the configured CRS_Configuration obtained in Step S410 is not the same as the serving cell's CRS_Configuration, it can predict ePDCCH is transmitted from a neighbor cell, and the serving cell's CRS is interference. Serving cell's CRS interference needs to be mitigated. Then, the procedure goes to Step S430.

Step S430, "Serving cell's CRS mitigation", with the information of its serving cell's CRS configuration, the UE can perform serving cell's CRS mitigation. In one non-limiting example, the UE can perform channel estimation, recover the CRS signal and subtract the CRS from the received data at the corresponding CRS REs before ePDCCH demodulation. Any existing CRS interference mitigation techniques can be applied in this step.

Step S440, "Other interference cells' CRS mitigation", besides the possible serving cell's CRS interference, some other interference cells' CRS can also be mitigated, e.g. by any existing CRS interference mitigation techniques, same or different from that used in Step S430 for the serving cell's CRS mitigation. These CRS assistant information can be obtained from NeighCellsCRSInfo-r11 defined in 3GPP TS 36.331.

After the CRS interference mitigation procedure 400 described above, the ePDCCH can be demodulated.

Based on the above procedure 400, the CRS to be mitigated can be dynamically changed from subframe to subframe. The change can be based on the ePDCCH transmission set, which is different from any traditional CRS mitigation method.

Signaling for ePDCCH Demodulation

With the CRS interference mitigation procedure 400 described above, the corresponding new signaling for ePDCCH demodulation may be provided as follows.

The IE ePDCCHCRSInfo-r11 is used to provide CRS RE information for ePDCCH resource mapping.

```
ePDCCHCRSInfo-r11 ::=        CHOICE {
    release                      NULL,
    setup                        ePDCCHCRS-InfoList-r11
}
ePDCCHCRS-InfoList-r11 ::= SEQUENCE (SIZE (1.. maxCellReport))
    OF ePDCCHCRSInfo-r11
ePDCCHCRSInfo-r11 ::= SEQUENCE {
    physCellId-r11               PhysCellId,
    antennaPortsCount-r11        ENUMERATED {an1, an2, an4,
                                              spare1}
}
```

NeighCellsCRSInfo-r11 Field Descriptions ePDCCHCRS-InfoList-r11

This field contains a list of CRS configurations, each CRS configuration corresponding to one ePDCCH set configuration.

maxCellReport is the number of ePDCCH sets.

physCellId-r11

This field contains CRS RE information for ePDCCH resource mapping.

antennaPortsCount-r11

This field indicates the number of antenna ports of the given CRS configuration, an1, an2 and an4 indicate 1, 2 and 4 antenna ports respectively.

When the physCellId-r11 is not the same as serving cell's cell ID and/or the antennaPortsCount-r11 is not the same as serving cell's number of antenna ports, the serving cell's CRS may be assumed as interference for ePDCCH demodulation.

CRS Mitigation for PDSCH Under CoMP

Similar to the CRS mitigation for ePDCCH under CoMP, the present disclosure also relates to the CRS mitigation for PDSCH demodulation. For PDSCH, the CRS configuration can be obtained from DCI.

Figure 5:
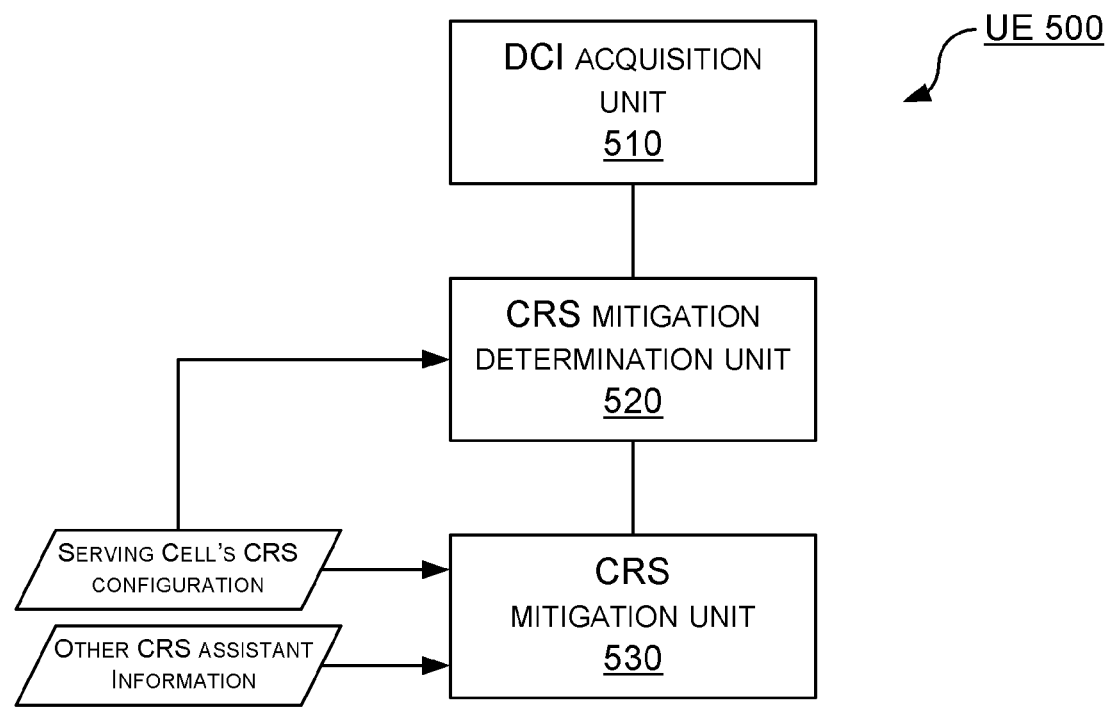
FIG. 5 shows a block diagram of UE 500 which has the capability of mitigating the serving cell CRS interference for PDSCH demodulation.

FIG. 5 shows a block diagram of UE 500 which has the capability of mitigating the serving cell CRS interference for PDSCH demodulation. FIG. 5 is similar to FIG. 3. Therefore, those elements with the same or similar functions are denoted with the same or similar reference signs, and the detailed descriptions are omitted when appropriate and for the purpose of simplification only.

As shown in FIG. 5, the UE 500 may include a DCI acquisition unit 510, a CRS mitigation determination unit 520, and a CRS mitigation unit 530.

The DCI acquisition unit 510 acquires DCI, in particularly, a CRS_Configuration signaled in the DCI (e.g., in the corresponding CRS configuration information) can be determined.

The CRS mitigation determination unit 520 can determine whether the CRS is to be mitigated or not. For the serving cell's CRS, the CRS mitigation determination unit 520 determines whether the CRS_Configuration acquired by the DCI acquisition unit 510 is the same as the UE's serving cell's CRS_Configuration. If the two CRS_Configurations are identical, it means that the PDSCH is coming from the UE's serving cell and there is no need to mitigate the serving cell's CRS (because the serving cell's CRS do not interfere the PDSCH). On the other hand, if the two CRS_Configurations are not identical, it means the PDSCH is coming from a neighbor cell but not the serving cell and there is a need to mitigate the serving cell's CRS. In both cases, the CRS mitigation determination unit 520 may further determine whether some other interference cell CRS need to be mitigated, for example, by referring to other CRS assistant information (which can be obtained from NeighCellsCRSInfo-r11 defined in 3GPP TS 36.331).

The CRS mitigation unit 530 is used for mitigating either or both of the serving cell's CRS and the other interference cell's CRS according to the determination results from the CRS mitigation determination unit 520. Any existing CRS interference mitigation techniques can be applicable to the serving cell's CRS and/or the other interference cell's CRS.

Thereafter, the CRS mitigation unit 530 can provide the data from which the CRS interference has been mitigated, for the subsequent PDSCH demodulation.

Figure 6:
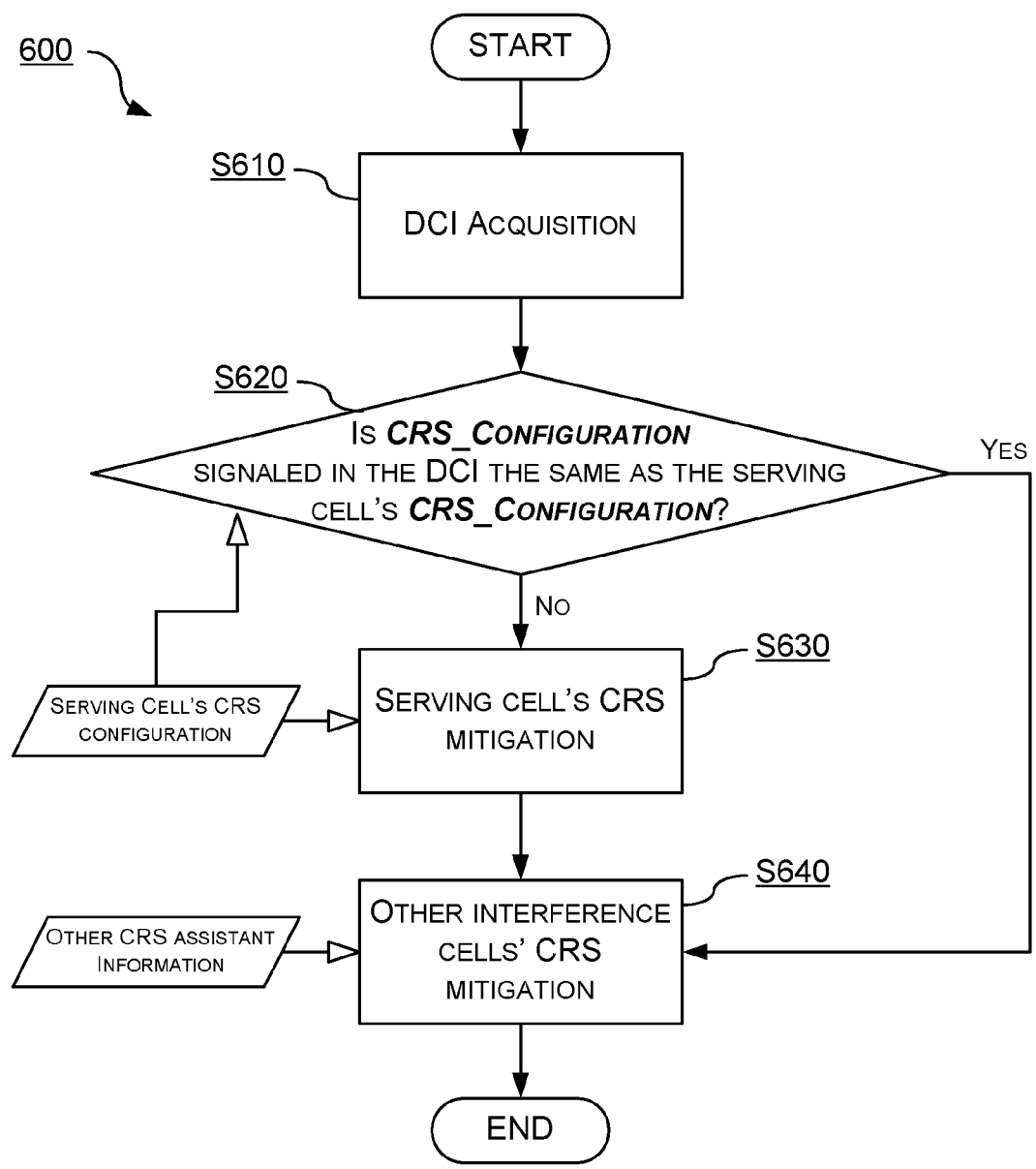
FIG. 6 shows a flowchart of the CRS interference mitigation method 600 for PDSCH demodulation according to the present disclosure.

FIG. 6 shows a flowchart of the CRS interference mitigation method 600 for ePDCCH demodulation according to the present disclosure. FIG. 6 is similar to FIG. 4. Therefore, those elements with the same or similar functions are denoted with the same or similar reference signs, and the detailed descriptions are omitted when appropriate and for the purpose of simplification only.

According to FIG. 6, the following steps CRS interference mitigation may be included.

Step S610, "DCI acquisition", UE (e.g., UE 500 in FIG. 5) can acquire DCI by monitoring its search space and get the corresponding CRS configuration information (including the CRS_Configuration) from its DCI.

Step S620, "Is CRS_Configuration signaled in the DCI the same as the serving cell's CRS_Configuration?", UE can decide whether the serving cell's CRS is interfering the PDSCH or not.

If the signaled CRS_Configuration obtained in Step S610 is the same as the serving cell's CRS_Configuration, it can predict PDSCH is transmitted from the serving cell. Serving cell's CRS is not interference. Then, the procedure goes to Step S640.

If the signaled CRS_Configuration obtained in Step S610 is not the same as the serving cell's CRS_Configuration, it can predict PDSCH is transmitted from a neighbor cell, and the serving cell's CRS is interference. Serving cell's CRS interference needs to be mitigated. Then, the procedure goes to Step S630.

Step S630, "Serving cell's CRS mitigation", with the information of its serving cell's CRS configuration, the UE can perform serving cell's CRS mitigation. In one non-limiting example, the UE can perform channel estimation, recover the CRS signal and subtract the CRS from the received data at the CRS-polluted REs before PDSCH demodulation. Any existing CRS interference mitigation techniques can be applied in this step.

Step S640, "Other interference cells' CRS mitigation", besides the possible serving cell's CRS interference, some other interference cells' CRS can also be mitigated, e.g. by any existing CRS interference mitigation techniques, same or different from that used in Step S430 for the serving cell's CRS mitigation. These CRS assistant information can be obtained from NeighCellsCRSInfo-r11 defined in 3GPP TS 36.331.

After the CRS interference mitigation procedure 600 described above, the PDSCH can be demodulated.

Based on the above procedure 600, the CRS to be mitigated can be dynamically changed from subframe to subframe. The change can be based on the CRS configuration signaled in the DCI, which is different from any traditional CRS mitigation method.

With the present disclosure, for ePDCCH/PDSCH, when the configured/signaled CRS configuration is not the same as serving cell's CRS configuration, significant performance improvement can be achieved.

The foregoing description gives only the preferred embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP 3$^{rd}$ Generation Partnership Project
CA Carrier Aggregation
CoMP Coordinated MultiPoint transmission/reception
CRE Cell Range Expansion
CRS Cell-specific Reference Signal
DM-RS DeModulation Reference Signal
eCCE enhanced Control Channel Element
ePDCCH enhanced Physical Downlink Control CHannel
eREG enhanced Resource Element Group
FeICIC Further enhanced Inter Cell Interference Coordination
HARQ Hybrid Automatic Repeat reQuest
IE Information Element
LTE Long Term Evolution
MIMO Multi-Input Multi-Output
PDSCH Physical Downlink Shared CHannel
PUCCH Physical Uplink Control CHannel
RE Resource Element
WI Work Item

REFERENCES

[1] 3GPP TSG-RAN WG1 #70bis, R1-124149, "Mapping of ePDCCH to RE", Ericsson, ST-Ericsson; and

[2] 3GPP TSG-RAN WG1 #70bis, R1-124159, "On resolving ePDCCH aggregation level ambiguity.", Ericsson, ST-Ericsson.

What is claimed is:

1. A Cell-specific Reference Signal (CRS) interference mitigation method, comprising steps of:
   determining CRS having been configured is not serving cell's CRS by comparing CRS configuration of each enhanced Physical Downlink Control Channel (ePDCCH) set configuration or each Physical Downlink Shared Channel (PDSCH) configuration with the CRS configuration of the serving cell; and
   mitigating interference originating from the serving cell's CRS by referring to serving cell's CRS configuration.

2. The CRS interference mitigation method according to claim 1, further comprising a step of detecting a current ePDCCH set configuration to determine a CRS configuration included in the current ePDCCH set configuration.

3. The CRS interference mitigation method according to claim 2, wherein if the determined CRS configuration is not identical to the serving cell's CRS configuration, it is determined that the CRS having been configured is not the serving cell's CRS.

4. The CRS interference mitigation method according to claim 2, wherein if the determined CRS configuration is identical to the serving cell's CRS configuration, it is determined that the CRS having been configured is the serving cell's CRS.

5. The CRS interference mitigation method according to claim 1, further comprising a step of acquiring Downlink Control Information (DCI) to determine a CRS configuration of each of the PDSCH configuration signaled in the DCI.

6. The CRS interference mitigation method according to claim 1, further comprising a step of mitigating other interference cell's CRS by referring to other CRS assistant information.

7. A User Equipment (UE), comprising:
   a Cell-specific Reference Signal (CRS) mitigation determination unit configured to determine CRS having been configured is not serving cell's CRS by comparing CRS configuration of each enhanced Physical Downlink Control Channel (ePDCCH) set configuration or each Physical Downlink Shared Channel (PDSCH) configuration with the CRS configuration of the serving cell; and
   a CRS mitigation unit configured to mitigate interference originating from the serving cell's CRS by referring to serving cell's CRS configuration.

8. The UE according to claim 7, further comprising:
   an ePDCCH set detection unit configured to detect a current ePDCCH set configuration to determine a CRS configuration included in the current ePDCCH set configuration.

9. The UE according to claim 8, wherein when the determined CRS configuration is not identical to the serving cell's CRS configuration, the CRS mitigation determination unit determines the CRS having been configured is not the serving cell's CRS.

10. The UE according to claim 8, wherein when the determined CRS configuration is identical to the serving cell's CRS configuration, the CRS mitigation determination unit determines the CRS having been configured is the serving cell's CRS.

11. The UE according to claim 7, further comprising:
    a Downlink Control Information (DCI) acquisition unit configured to acquire DCI to determine a CRS configuration of each of the PDSCH configuration signaled in the DCI.

12. The UE according to claim 7, wherein the CRS mitigation unit is further configured to mitigate other interference cell's CRS by referring to other CRS assistant information.

* * * * *